United States Patent [19]

Jamison

[11] 3,950,689
[45] Apr. 13, 1976

[54] METHOD AND APPARATUS FOR CHARGING AND DISCHARGING A BATTERY

[76] Inventor: Robert M. Jamison, 6809 Mayfield Road, Apt. 1554, Mayfield Heights, Ohio 44124

[22] Filed: Nov. 27, 1974

[21] Appl. No.: 527,891

Related U.S. Application Data

[63] Continuation-in-part of Ser. No. 354,753, April 26, 1973, abandoned.

[52] U.S. Cl. .................. 320/5; 320/14; 307/46; 307/66; 321/13
[51] Int. Cl.² .................. H02J 7/00; H02J 1/12
[58] Field of Search .................. 321/13; 307/44–46, 66, 133; 323/22 T; 320/9–14, 20, 5

[56] References Cited

UNITED STATES PATENTS

| | | | |
|---|---|---|---|
| 3,435,248 | 3/1969 | Geis | 307/46 |
| 3,693,027 | 9/1972 | Garaway | 307/133 |

Primary Examiner—J. D. Miller
Assistant Examiner—Robert J. Hickey
Attorney, Agent, or Firm—J. Darrell Douglass

[57] ABSTRACT

A method and apparatus for charging and discharging batteries is disclosed comprising solid-state devices wherein the power removed from the battery during the discharge operation is converted and transferred to an alternating current power line wherein this delivered power is consumed by the loads normally on the line. Conversely, the apparatus may be used to remove power from the power line to charge batteries.

7 Claims, 3 Drawing Figures

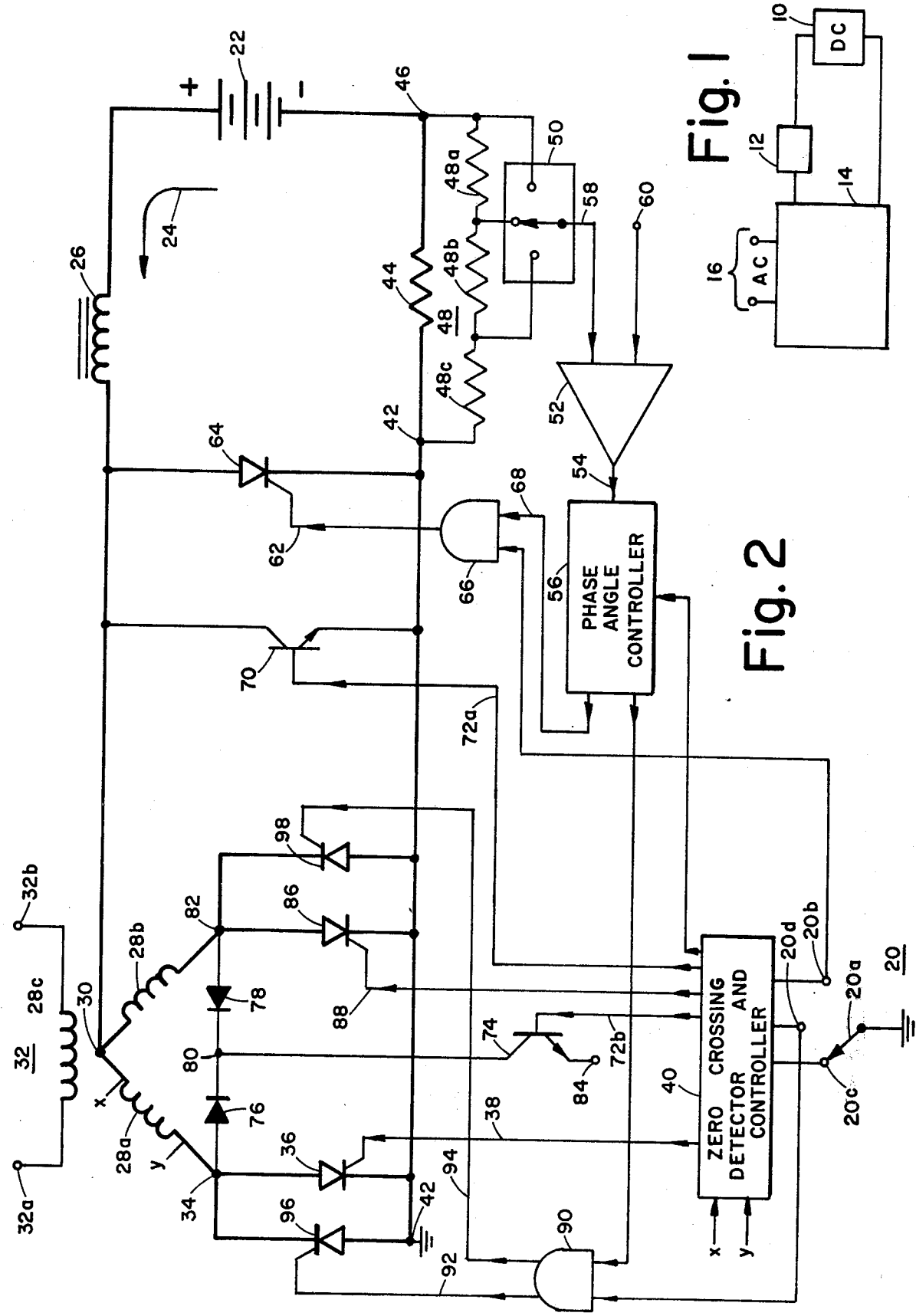

METHOD AND APPARATUS FOR CHARGING AND DISCHARGING A BATTERY

This application is a continuation-in-part of my copending application Ser. No. 354,753 filed Apr. 26, 1973, now abandoned.

The field of the invention involves the discharge of batteries, more specifically the conditioning of batteries.

DESCRIPTION OF THE PRIOR ART

In storage batteries, particularly those of the nickel-cadmium type, there are three common reasons for discharge. One is to discharge the battery to the zero-energy point in order to clear out the memory retention caused by use at less than full capacity. The second reason is to analyze the battery to assure it has an acceptable capacity for service use. And third, good safety practices require the battery to be discharged to a zero-energy point for safe shipment.

Heretofore the method predominantly used in battery dischargers has been to apply a constant resistance load to the battery and to discharge the battery for a time duration and to observe the battery end-voltage as a criterion of acceptance of the ampere-hour capacity of the battery. Because the battery voltage does not remain constant during the discharge period, but rather decreases with time, constant current does not flow from the battery. Due to this variance, the actual ampere-hour capacity of a battery cannot be obtained accurately by a time measurement, but only approximated. In the more elaborate systems, applying different load resistors or electronically driving load transistors to different points of conductivity have been used. Thus, in these prior devices, the battery power was converted into heat and dissipated and was an irrecoverable loss. Since the battery was partially or fully discharged by the discharge cycle, an amount of energy was required to be returned to the battery before the battery could be put into service. Inasmuch as the energy removed from the battery was irrecoverable, it required utilizing recharge energy from another source of supply.

SUMMARY OF THE INVENTION

The present invention discharges a battery and delivers the power removed therefrom back to a source of AC power which may be the AC power line. This apparatus provides versatility in selecting the discharge rate at the desired current which may be kept constant allowing accurate and simple measurement of ampere-hours at a particular discharge rate. In addition, the apparatus provides improvements in cost, size, weight, and reliability of the discharger and charger system. The discharge-analysis of a battery causes a significant amount of electrical energy to be withdrawn from the battery. By incorporating a small number of extra components used with the components already present in the discharger, the system about to be described is used to charge batteries. By the invention, the power removed from the battery may be applied to an AC source, which may be an AC power line, where it is consumed by the other loads, thereby saving on the expense of power and relieving the burden on the power source during the discharge operation. Therefore, instead of converting the power to heat which in general is not useful, the power is converted to AC electrical energy which is useful.

BRIEF DESCRIPTION OF THE DRAWINGS

In the drawings:
FIG. 1 shows the fundamental concept of the invention in block diagram form,
FIG. 2 is a schematic of an embodiment of a battery discharger and charger incorporating this invention.

DESCRIPTION OF THE PREFERRED EMBODIMENT

Figure 3:
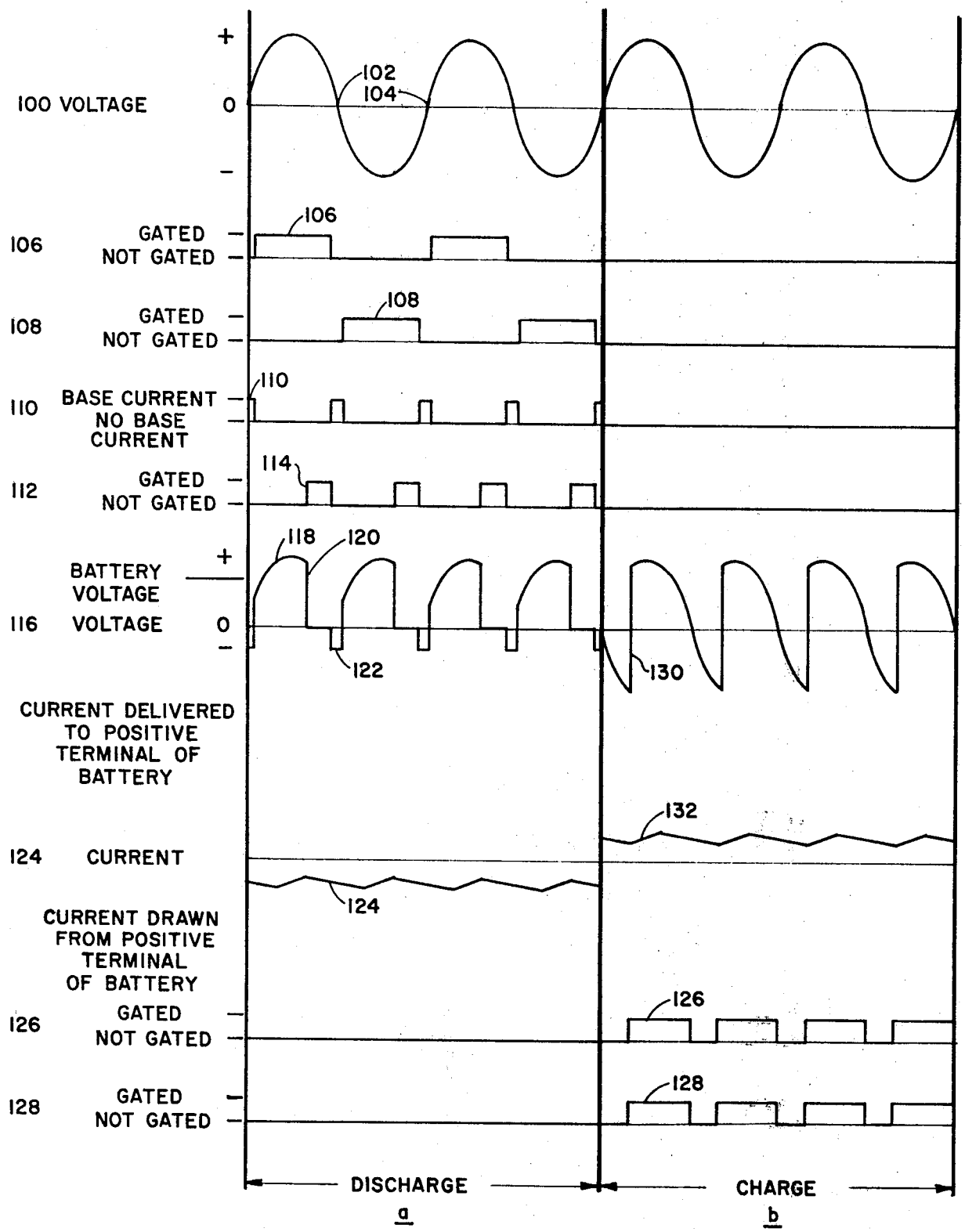
FIG. 3 presents a series of waveforms during operation of the embodiment of FIG. 2.

The invention about to be described will be described in connection with a specific embodiment to afford a better understanding thereof. It will be understood that various departures may be made from the specific disclosure by those versed in the art and that the invention is not limited to the specific disclosure except as defined by the appended claims.

Referring to FIG. 1, there is a block diagram broadly illustrating the invention, wherein 10 represents a DC potential source which may be a battery, the current from which flows into a device 12, which is electrically compliant with a voltage difference to limit the current from the battery, and into device 14 which is a DC to AC converter the output of which is applied to an AC source as AC line 16.

FIG. 2 is a specific circuit diagram of the general concept shown in FIG. 1. Switch 20 is set so that wiper 20a is in position 20b for the discharge operation. During discharge, battery 22 delivers current as indicated by the arrow 24 through inductive reactance 26 to the junction of windings 28a and 20b. 28a, 28b, and 28c is transformer 28 with windings 28a and 28b inductively coupled to winding 28c. The windings 28a and 28b may be a single winding with a center tap connected to line 30. At this particular point in time, the AC voltage of the AC line 32 which is across the winding 28c is such that line 30 which is connected to one end of winding 28a is positive with respect to the other end of the winding at point 34.

An SCR 36 is connected between point 34 and ground. It is gated on by the signal on line 38 from the zero crossing detector and controller 40 which is connected at points $x$ and $y$ at opposite ends of winding 28a and thus is receiving a signal from the AC line 32 via the winding 28a. At this time, battery current 24 flows through SCR 36 by way of common line 42 through resistance 44 and back to the negative terminal of the battery 46. This current from the battery passing through transformer winding 28a is of such phase relationship with current in the line 32 in the transformer winding 28c that this current is coupled to the AC power line by transformer winding 28c whereby the current will flow into the line terminal which is positive at this particular half-cycle of AC power line voltage. The battery discharge current 24 passes through resistance shunt 44 developing a control voltage across points 42 and 46 directly in proportion to current 24. 44 is a small resistor of the order of 10 milliohms for the purpose of developing a voltage of sufficient magnitude for operating the comparator about to be described.

This voltage developed across resistance 44 is divided by resistance network 48, which in this embodiment consists of divider network 48a, and 48b, and 48c disposed across resistance 44, and a current selector switch 50 which connects to comparator 52 producing an output at 54 to phase angle controller 56 in proportion to the difference in voltages between the time average of the output of said divider network at 58 and a DC voltage reference at point 60 also applied to the comparator. A gating signal is applied from the phase angle controller at point 62 to the gate of SCR 64 by the way of "and" gate 66 when the phase angle controller 56 has an output gating potential which is phase related to the AC line at 68 and switch 20 is set as previously described. The battery current 24 now flows at an increasing magnitude through SCR 64, said SCR being a zero-potential load which causes an increasing current 24 to flow from the battery 22, the time rise of the current being limited by inductor 26. This current continues to flow for the remainder of the half cycle of AC line potential.

The transformer is so designed that the voltage at winding 28a will conduct a lower current than the lowest current desired from the apparatus with SCR 64 not conducting. In other words, if the lowest battery current desired from the apparatus is 2 amperes, the transformer is chosen such that less than 2 amperes will flow into the transformer with SCR 64 in a non-conducting state.

A transistor 70 connected between line 30 and return line 42 has its base connected by line 72a to zero-crossing detector and controller 40 which delivers a signal at the point where the AC line 32 drops to approximately zero volts. Transistor 70, which has its collector and emitter connected between lines 30 and 42 respectively, shunts battery current 24 from SCR 64 which turns off said SCR. A transistor 74 connects to the cathodes of a pair of diodes 76 and 78 at point 80. The anodes of diodes 76 and 78 are connected to points 34 and 82 respectively being the ends of the split winding. Transistor 74, which has a negative working potential applied at 84 on the emitter, receives a signal from zero crossing detector and controller 40 on line 72b and forward biases diode 76 lowering the potential of point 34 to a negative working potential applied at 84 to the emitter of transistor 74 so that SCR 36 is reverse biased.

After the finite duration of the events at zero crossing, battery current 24 now flows through transformer winding 28b which at this time has a potential difference on line 30 larger than that on terminal 82 and through SCR 86 which is now gated on by the signal flowing through line 88 zero crossing detector and controller 40. This current is again coupled into transformer winding 28c where it is applied to the AC line 32 in opposite direction as before described because the polarity of the line 32 has reversed. The operation of SCR 86 causing current 24 to flow through winding 28b acts in a manner similar to that described with SCR 36 and transformer winding 28a. Again SCR 64 turns on at the proper time as determined by the signal from phase angle controller 56 allowing the battery current 24 which has decayed by virtue of dissipating the energy stored in inductor 26 into the transformer winding 28b so that the average value of battery current 24 is the desired value. SCR 64 is again turned off at the zero-crossing of the AC line voltage by transistor 70 and SCR 86 is commutated by transistor 74 conducting current through diode 78.

During the preceding operations, the battery current 24 has been transferred to either transformer winding 28a or 28b whichever was the same polarity as that of the battery. The average battery current 24 has been regulated by SCR 64 to the proper value as controlled by comparator 52.

When no battery current is desired, such as when connecting the apparatus to the battery or when the battery has been fully charged, an idle switch position may be desired. This switch may be operated automatically or manually. Switch wiper 20a is set at position 20c during the idle period and because "and" gates 66 and 90 cannot deliver an output signal because there is no signal on one of the inputs, this prevents any gate signal on lines 62, 92, and 94 from SCR's 64, 96, and 98 respectively, therefore said SCR's do not conduct and thus no battery current 24 flows through the SCR's. Additionally, switch 20 applies a control signal to zero crossing detector and controller 40 which inhibits conduction of SCR's 36 and 86 and transistors 70 and 74.

When switch wiper 20a is set to the charge position 20d, the zero-crossing detector and controller 40 does not gate SCR's 36, 86 and 64 and transistors 70 and 74 are cut off. SCR's 96 and 98 are gated by a phase angle controlled pulse delivered on lines 92 and 94 respectively from "and" gate 90 in turn controlled by phase angle controller 40. Battery current 24 flows in opposite direction to the arrow shown.

FIG. 3 shows the time domain waveforms present at various points in the schematic of FIG. 2 which are correlated with the waveform on the AC power line. Waveforms during the discharge cycle are shown at a and waveforms during the charge cycle are shown at b. The voltage waveform which is the difference potential between points 30 and 34 is shown by waveform 100. This waveform is not intended to represent any particular frequency or voltage level but is merely shown to represent the alternating nature of the voltage. Two points where this waveform intersects the zero voltage axis is shown at 102 and 104.

Waveform 106 displays the output of zero crossing detector and controller 40 which is applied to the gate of SCR 36 by the way of line 38 and occurs whenever waveform 100 is positive. Similarly, waveform 108 is applied to the gate of SCR 86 from the zero crossing detector and controller 40 on line 88 whenever waveform 100 is negative. The zero crossing detector and controller 40 also applies a saturating signal 110 of finite duration to the bases of transistors 70 and 74 on lines 72a and 72b respectively which saturates said transistors during the duration of this signal allowing SCR's 64 and 36 or SCR's 64 and 86 to commutate. Waveform 112 displays the signal applied to the gate of SCR 64 from phase angle controller 56 through "and" gate 66 to line 62. The leading edge 114 of this signal varies to the right to decrease and to the left to increase the time which SCR 64 is on and varies the current 24 flowing from the positive terminal of the battery. In the constant current application shown in FIG. 2, the phase angle will adjust until the voltage from the output of divider network 50 is equal to the reference voltage 60, at this time the average battery current 24 has reached the programmed current as determined by the current to voltage converter 44, 48.

Waveform 116 shows the voltage difference between lines 30 and 42. When SCR 36 is gated on and when the AC potential drop across the transformer winding 28a at points 30 and 34 starts the half-cycle, the voltage rises on waveform 100 as shown at 118, the battery being decoupled by inductor 26. At a point in the half-cycle defined by phase angle controller 56, SCR 64 is gated on by the signal shown at 114 at this time the voltage, as shown at 120, drops to zero, whereupon SCR 64 conducts battery current 24. This voltage remains at zero until signal 110 saturates transistor 70 shunting battery current 24 to line 42 and allowing SCR 64 to commutate. Signal 110 on line 72b also saturates transistor 74 at this time, reverse biasing SCR's 36 and 86. Depending on the inductance of transformer 28, the voltage waveforms indicated by 116 may drop to the negative voltage on line 84 as shown at 122.

Current waveform 124 shows the battery current 24 flowing from the positive terminal of the battery 22. When the waveform at 116 is lower than the battery voltage, the slope of waveform 124 is away from the zero current axis and when the waveform 116 voltage is in excess of the battery voltage the current waveform 124 slopes toward the zero-current axis by the properties of the reactance of inductor 26.

Inductor 26 is chosen to be large enough to operate to smooth the lowest AC source frequency that the apparatus will encounter. The highest operating frequency of the apparatus is determined by the speed of the switching components. In practical applications, the apparatus can be designed to operate over a range of AC source frequencies which may be from 25 to 2,000 Hertz.

The charge waveforms are presented in b. The charge SCR's 96 and 98 receive a gating signal at the proper phase point on lines 92 and 94 respectively as shown by waveforms 126 and 128. The particular SCR that is previously non-conducting is turned on by the gating waveform and conducts causing an abrupt rise in the waveform 116 shown at 130. When the AC voltage reverses polarity, the conducting SCR continues to conduct until the complementary SCR is gated on.

The current 124 now appears on the other side of the zero-current axis as shown at 132 because the battery current 24 is flowing into the positive terminal of the battery. Again, inductor 26 provides the necessary electrical compliance to couple the battery 22 and the transformer 28 and also to smooth the ripple in battery current 24.

I claim:

1. An apparatus for removing power from a direct current source and transmitting the power to an AC source which is providing usable current to a load, comprising switching means between said DC power source and the AC source, and means for controlling said switching means at a rate controlled entirely by the AC source frequency to remove power from said DC power source and deliver it to the AC source wherein the source frequency may be any frequency in a wide range between 25 and 2,000 Hz and wherein said switch controls the power to furnish current from the direct current power source in the proper direction to combine with the current of the AC source to said load, whereby said current supplements the AC source current, means disposed between said DC power source and said AC source for sensing the AC voltage and utilizing said sensed voltage to control said switch, said switching means including an AC voltage zero crossing detector, a controller connected to said detector and said switch means, a current line connected to said DC source wherein the DC current is controlled by current sensing means disposed in the current line between the DC source and said switch to sense the current in the line from the DC source, a source of reference potential, comparator means connected to said sensing means and said source of reference potential, a phase angle controller connected to the output of the comparator means, second switching means disposed across the DC source and said phase angle controller connected to said controller and said switch means.

2. An apparatus as described in claim 1 wherein said phase angle controller is connected between the comparator and the switching means and wherein said zero crossing detector is connected to the phase angle controller.

3. The method of removing power from a DC power source and applying said power to supply the current from the source to the terminals of an AC source which comprises supplying current from the DC power source in proper phase relationship such that the power flows from the DC power source to the AC source and supplements the power in the AC source wherein the current delivered to the AC source from the DC power source is interrupted at a rate the same as the AC source frequency, controlling the direction of the current from the DC source, delivering said current to a terminal of the AC source when it is positive and applying the current to the most positive of the AC power source terminals.

4. The method as described in claim 3 wherein the current is applied alternately to first one terminal and then the other of the AC source.

5. The method described in claim 3 which comprises maintaining the time average of said current constant by alternately applying the current to the AC source and to a shunt in timed proportion to control said current.

6. The method described in claim 5 wherein said control operates by sensing the current from the DC source and governing the proportioning time.

7. The method described in claim 6 preventing sudden changes in current from the DC power source by impeding the flow of current between said source and said shunting means and the AC source.

* * * * *